(12) United States Patent
Kim et al.

(10) Patent No.: US 7,625,650 B2
(45) Date of Patent: Dec. 1, 2009

(54) MEMBRANE-ELECTRODE ASSEMBLY AND FUEL CELL SYSTEM COMPRISING THE SAME

(75) Inventors: Hee-Tak Kim, Suwon-si (KR); Young-Mi Park, Suwon-si (KR); Hae-Kwon Yoon, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 513 days.

(21) Appl. No.: 11/291,102

(22) Filed: Nov. 29, 2005

(65) Prior Publication Data

US 2006/0141314 A1 Jun. 29, 2006

(30) Foreign Application Priority Data

Nov. 29, 2004 (KR) .................. 10-2004-0098553

(51) Int. Cl.
*H01M 8/10* (2006.01)
(52) U.S. Cl. ......................... 429/30; 429/33
(58) Field of Classification Search .............. 429/30, 429/33
See application file for complete search history.

(56) References Cited

U.S. PATENT DOCUMENTS

2002/0015870 A1 * 2/2002 Cownden et al. .......... 429/19
2003/0088239 A1 * 5/2003 Takaki et al. .............. 606/1
2003/0104284 A1 * 6/2003 Inagaki et al. ............. 429/303
2004/0101730 A1 5/2004 Hirano et al.
2004/0126666 A1 * 7/2004 Cao et al. .................. 429/313
2004/0149572 A1 * 8/2004 Schlenoff et al. .......... 204/296

FOREIGN PATENT DOCUMENTS

| EP | 0 575 791 B1 | 5/1997 |
| JP | 2003-031232 | 1/2003 |
| JP | 2004-190002 | 7/2004 |
| WO | WO 02/091507 A1 | 11/2002 |
| WO | WO 2004/042839 A2 | 5/2004 |
| WO | WO 2004/042839 A3 | 5/2004 |
| WO | WO 2004102692 A2 * | 11/2004 |
| WO | WO 2005027144 A1 * | 3/2005 |

OTHER PUBLICATIONS

Yu et al; Activity coefficients of NaCl in polyelectrolyte solutions from EMF measurements; Fluid Phase Equilibria (2001) 190(1-2), 191-199.*

* cited by examiner

*Primary Examiner*—Patrick Ryan
*Assistant Examiner*—Muhammad Siddiquee
(74) *Attorney, Agent, or Firm*—Christie, Parker & Hale, LLP

(57) ABSTRACT

The present invention relates to a membrane-electrode assembly and a fuel cell system including an anode and a cathode facing each other, the polymer electrolyte membrane being interposed between the anode and the cathode, and the membrane-electrode assembly including an amphiphilic block copolymer including a hydrophobic block and a hydrophilic block of the polymer electrolyte membrane.

16 Claims, 2 Drawing Sheets

MEMBRANE-ELECTRODE ASSEMBLY AND FUEL CELL SYSTEM COMPRISING THE SAME

CROSS-REFERENCE TO RELATED APPLICATION

This application claims priority to and the benefit of Korean Patent Application No. 10-2004-0098553 filed with the Korean Intellectual Property Office on Nov. 29, 2004, the entire content of which is incorporated herein by reference.

FIELD OF THE INVENTION

The present invention relates to a membrane-electrode assembly and a fuel cell system comprising the same, and more particularly to a membrane-electrode assembly including a polymer electrolyte membrane which includes an amphiphilic block copolymer having a hydrophobic block and a hydrophilic block, and a fuel cell system comprising the same.

BACKGROUND OF THE INVENTION

A fuel cell can be classified as a phosphoric acid type, a molten carbonate type, a solid oxide type, a polymer electrolyte type, or an alkaline type of fuel cell depending upon the kind of electrolyte used. Although each fuel cell effectively operates in accordance with the same basic principles, they may differ from one another in the kind of the fuel, operating temperature, catalyst, and electrolyte depending upon the type of cell.

Recently, polymer electrolyte membrane fuel cells (PEMFC) that have power characteristics which are superior to those of conventional fuel cells, as well as lower operating temperatures and quicker starting and response characteristics, have been developed. They are advantageous in that they can have a wide range of applications such as for a mobile power source for automobiles, a distributed power for houses and public buildings, and as a small electric source for electronic devices.

The polymer electrolyte membrane for a fuel cell should typically have high chemical and mechanical stability and high proton conductivity, and be made with a low cost.

A perfluoronated cation exchange membrane such as NAFION™ manufactured by the Dupont Company has been used as a conventional polymer electrolyte membrane. However, the polymer is very expensive and may permit the underisable cross-over of a liquid fuel such as methanol.

Therefore, for the polymer electrolyte membrane, a heat-resistant polymer such as polybenzimidazole (PBI) or polyethylenesulfone (PES) has been suggested.

However, while such heat-resistant polymers tend to have good chemical stability, they also tend to have low elasticity and hygroscopicity and thus, low proton conductivity.

European Patent No. 0 575 791 discloses a sulfonated aryl polymer such as polyetheretherketone (PEEK) and polyetherketone (PEK). However, such polymers can swell at a high temperature and thus a membrane made of the polymers is not suitable for a fuel cell.

There are approaches to making a polymer electrolyte membrane by blending a heat-resistance polymer and a sulfonated aryl polymer. However, such blended polymers tend to deteriorate membrane uniformity when hydrated by water while driving the fuel cell, and thus internal stress increases.

SUMMARY OF THE INVENTION

In order to solve the aforementioned problem, an embodiment of the present invention is to provide a membrane-electrode assembly which includes a polymer electrolyte membrane containing an amphiphilic block copolymer having a hydrophobic block and a hydrophilic block, and thus has improved physicochemical stability and proton conductivity.

Another embodiment of the present invention is to provide a fuel cell system, including the membrane-electrode assembly, with improved efficiency.

The present invention provides a membrane-electrode assembly including an anode and a cathode, a polymer electrolyte membrane which is interposed therebetween, and an amphiphilic block polymer having a hydrophobic block and a hydrophilic block.

The present invention also provides a fuel cell system which includes an electricity generating element comprising i) a membrane-electrode assembly with an anode and a cathode, a polymer electrolyte membrane which is interposed therebetween, and the polymer electrolyte membrane including an amphiphilic block polymer having a hydrophobic block and a hydrophilic block, and ii) a separator positioned at both sides of the membrane-electrode assembly; a fuel supplier; and an oxidant supplier.

BRIEF DESCRIPTION OF THE DRAWINGS

A more complete appreciation of the invention and many of the attendant advantages thereof will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
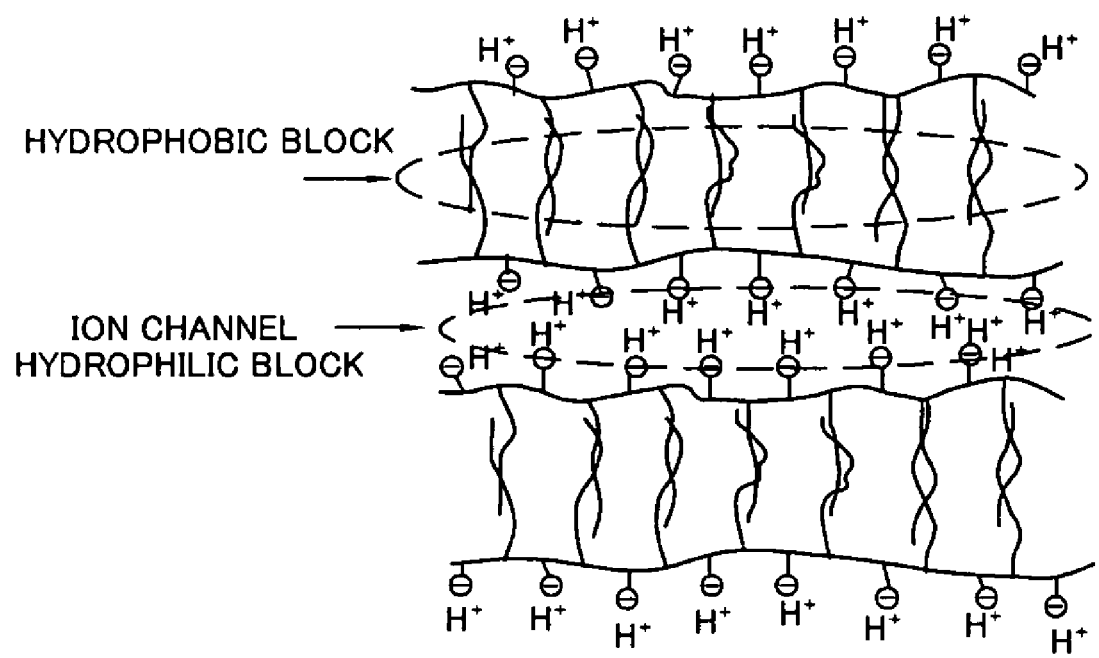
FIG. 1 is a schematic view illustrating a hydrated amphiphilic block copolymer according to the present invention.

In the following detailed description, certain embodiments of the invention have been shown and described, simply by way of illustration of the best mode contemplated by the inventors of carrying out the invention. As will be realized, the invention is capable of modification in various respects, all without departing from the invention. Accordingly, the drawings and description are to be regarded as illustrative in nature and not restrictive.

A membrane-electrode assembly for a fuel cell includes a cathode, an anode, and a polymer electrolyte membrane interposed therebetween. Fuel (hydrogen) is supplied to an anode, and an oxidant (oxygen) is supplied to the cathode. Then protons are generated from the fuel oxidization at the anode and the protons move to the cathode through the polymer electrolyte membrane to generate energy and water.

In accordance with an exemplary embodiment of the present invention, the efficiency of a fuel cell is improved by using a polymer electrolyte membrane including an amphiphilic block copolymer having a hydrophobic block and a hydrophilic block, thus increasing the proton mobility speed between the cathode and anode.

An amphiphilic block copolymer typically assembles into a structure, wherein a hydrophobic block is oriented to decrease the free energy of a system and to avoid water. It can also maintain a thermodynamically stable structure with the hydrophilic block in an aqueous solution.

Therefore the amphiphilic block copolymer can make a more stable structure by entanglement and crystallization of a polymer chain, as compared to a singular polymer or a blending polymer of the properties of the composition block. The amphiphilic block polymer may reveal various structural characteristics. For example, the characteristics of a structure forming an amphiphilic polymer are changed by the molecular weight of the polymer, the ratio of hydrophilicity/hydrophobicity, the strength of the block, the affinity between blocks, the molecular structure of the block, the charge of the hydrophilic block, and presence of introduced ligands.

The hydrophilic block forms a hydrophilic domain having a size ranging from 10 nm to 500 nm, and the hydrophobic block forms a hydrophobic domain having a size ranging from 10 nm to 1000 nm.

According to the present invention, the hydrophobic block has a structure of the following Formula 1:

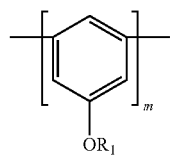

(1)

where $R_1$ is $C_nH_{2n+1}$ or $C_nF_{2n+1}$,
n is an integer ranging from 1 to 100, and
m is an integer ranging from 1 to 100.

In general, as n in Chemical Formula 1 increases, the hydrophobicity of the hydrophobic block increases and ion conductivity decreases.

In one embodiment, n ranges from 5 to 50, allowing the assembly between the hydrophobic blocks to occur more easily.

The hydrophilic block of the present invention also includes a hydrophilic monomer.

Examples of the hydrophilic monomer include unsaturated ethylene-based mono- or dicarboxylic acids such as acrylic acid, methacrylic acid, itaconic acid, maleic acid, or fumaric acid; amides of unsaturated carboxylic acids such as (meth)acrylamide; ethylene-based monomers containing phosphonic acid groups such as vinylphosphonic acid, ethylene-based monomers containing phosphate groups or phosphonate groups, or ethylene-based monomers containing sulfonic acid groups such as vinylsulfonic acid, vinylbenzenesulfonic acid, α-acrylamidemethylpropanesulfonic acid, or 2-sulfoethylene (meth)acrylate; phosphated polyethylene glycol (meth)acrylates, phosphated polypropylene glycol (meth)acrylates, or derivatives thereof; cationic monomers selected from amino(alkyl) (meth)acrylate or amino(alkyl) (meth)acrylamide; heterocyclic group-containing monomers including a secondary, tetriary, or quaternary ammonium functional group, nitrogen atoms, vinylamine, or ethyleneimine; cyclic amides of vinylamine such as N-vinylpyrrolidone; poly((alkyl) acrylic acid); and mixtures thereof. In this text, the alkyl means a $C_1$ to $C_5$ alkyl.

More preferably, according to the present invention, the hydrophilic block includes an etherketone-based polymer represented by the following Formulas 2 to 5, a phosphoric acid amide-based polymer represented by the following Formula 6, a benzimidazole-based polymer represented by the following Formulas 7 and 8, a styrene-based polymer represented by the following Formula 9, a vinylether-based polymer represented by the following Formula 10, a vinylalcohol-based polymer represented by the following Formula 11, an amide-based polymer represented by the following Formula 12, a cyclic amine-based polymer represented by the following Formulas 13 and 14, and mixtures thereof.

The following examples illustrate representative structures of the polymer; however, the polymer can have various substituents and is not limited by these structures. It is preferable that the hydrophilic block is ionized to anions, allowing protons to move easily, and exists in the form of a salt which is selected from the group consisting of chloride, hydrogen sulfate, alkyl sulfate, phosphate, citrate, and formate, and combinations thereof to be ionized to anions.

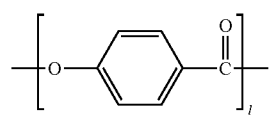

(2)

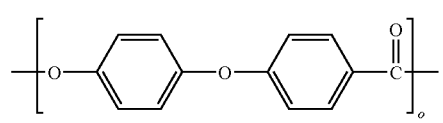

(3)

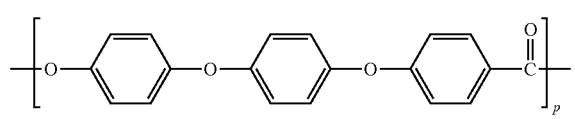

(4)

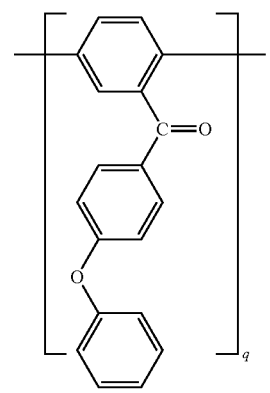

(5)

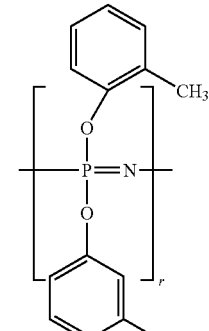

(6)

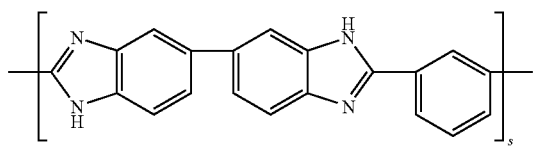

(7)

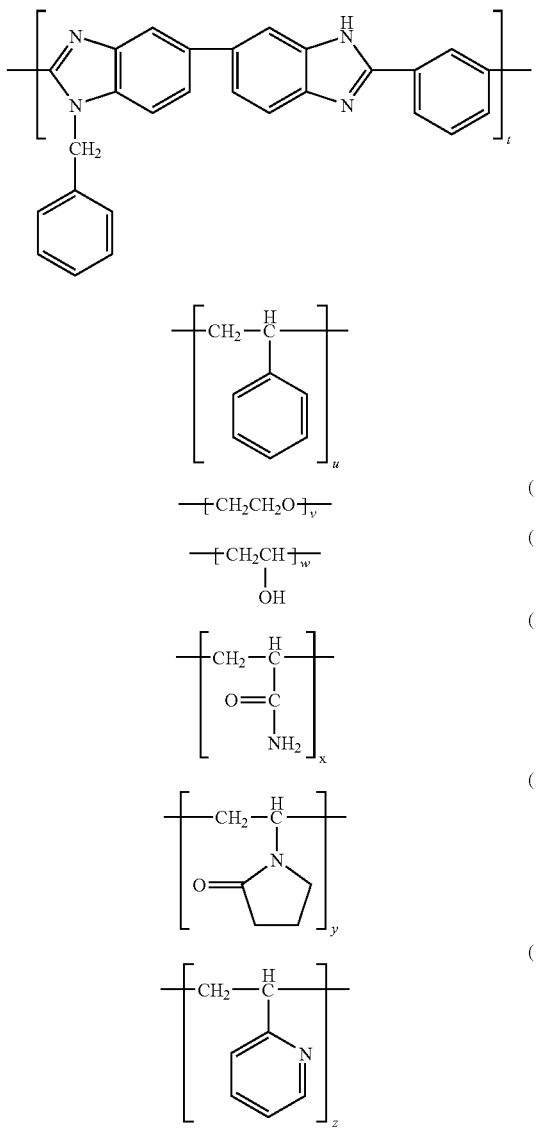

where in the above Formulas 2 to 14, l to z are integers ranging from 1 to 200.

FIG. 1 is a schematic view showing a hydrated, amphiphilic block copolymer of the present invention which forms an ion channel by assembling hydrophobic blocks that include a long chain hydrocarbon or hydrogen fluoride, and hydrophilic blocks including relatively short chains, respectively. Through the ion channel, protons generated at the anode are moved smoothly to increase ion conductivity. Further, the hydrophilic block maintains the strength of the membrane and dimensional stability if the polymer electrolyte membrane is expanded by moisture, and provides flexibility to increase processibility. Furthermore, hydrophilic blocks maintain ion conductivity above a predetermined level by enabling protons to move smoothly therebetween.

As described above, the amphiphilic block copolymer includes a hydrophobic block and a hydrophilic block which are arranged in a block copolymer structure selected from the A-B type, A-B-A type, and B-A-B type, where A is a hydrophobic block and B is a hydrophilic block.

The hydrophobic block and the hydrophilic block of the amphiphilic block copolymer are present in a mole ratio ranging from 0.2:0.8 to 0.5:0.5. As the mole ratio of the hydrophilic block increases, ion conductivity increases but mechanical strength is decreased in water.

In one embodiment, the weight average molecular weight of the hydrophobic block ranges from 10,000 to 100,000, and the weight average molecular weight of the hydrophilic block ranges from 20,000 to 500,000. Typically, when the molecular weight of the hydrophobic block is less than the ranges above, mechanical strength is deteriorated when it is swelled by water, and when it is more than the ranges, ion conductivity is decreased because an ion conductive channel is not formed. For the hydrophilic block, ion conductivity typically decreases when the molecular weight is less than the range, and mechanical strength is deteriorated when it is more than the range.

The polymer electrolyte membrane of the present invention may be formed by dissolving the amphiphilic block copolymers in a solvent and making a film-shaped membrane using a general casting method. The general casting method is performed using any method which is generally performed in the related art. For example, it may be a liquid coating method selected from a gravure method, a bar coating method, a doctor blade method, a spray method, spin coating, and combinations thereof.

The solvent may be selected depending on the proton conductive polymer and hydrophilic plasticizer. Particularly, it may be selected from the group consisting of methanol, ethanol, propanol, butanol, isopropanol, dimethylformamide, dimethylacetamide, dimethylsulfoxide, N-methyl-2-pyrrolidone, isophorone, and combinations thereof.

According to the present invention, the polymer electrolyte membrane is interposed between the cathode and anode to form a membrane-electrode assembly.

The anode and cathode each include a diffusion layer and a catalyst layer. The catalyst layer includes a metal catalyst which promotes the oxidation of hydrogen and reduction of an oxidant. The metal catalyst material may be selected from, but is not limited to, platinum, ruthenium, osmium, platinum-ruthenium alloys, platinum-osmium alloys, platinum-palladium or platinum-M alloys (where M is at least one selected from the group consisting of Ga, Ti, V, Cr, Mn, Fe, Co, Ni, Cu, and Zn) and combinations thereof. Preferred catalysts include metals selected from the group consisting of platinum, ruthenium, osmium, platinum-ruthenium alloys, platinum-osmium alloys, platinum-palladium alloys, platinum-cobalt alloys, and platinum-nickel alloys.

Further, the metal catalyst is generally one supported with a carrier. The carrier may include carbon such as acetylene black, or graphite, or may comprise an inorganic particulate such as alumina, silica, zirconia, or titania. When the catalyst is a noble metal supported with a carrier, it may include any one available in the market, or be prepared by supporting the noble metal on a carrier. Commercially available catalysts already provided or a carrier may be used, or the catalyst may be supported on a carrier using well known methods which need not be explained in detail here.

The fuel cell supplies hydrogen or fuel to the anode and an oxidant to the cathode, and thus generates electricity by electrochemical reaction at the anode and the cathode.

Voltage differences between the anode and cathode are generated by the oxidation reaction of hydrogen or an organic raw material, at the anode, and a reduction reaction of the oxidant at the cathode.

Carbon paper or carbon cloth may be used for the diffusion layer, but is not limited thereto.

The diffusion layer supports the electrode for the fuel cell and renders the reactants to diffuse to the catalyst layer and to easily contact the catalyst layer. The diffusion layer of carbon paper or carbon cloth is preferably treated with a water-repellent fluoride resin such as polytetrafluoroethylene, to prevent a decrease of the reactant diffusion efficiency, which may be caused by water which is produced while driving the fuel cell. Furthermore, the electrode may include a microporous layer to increase the reactant diffusion efficiency of the diffusion layer between the diffusion layer and the catalyst layer. The microporous layer may be formed by coating a composition including a conductive material such as carbon powder, carbon black, activated carbon, or acetylene black, a binder such as polytetrafluoroethylene, and if necessary an ionomer.

In accordance with the present invention, the membrane-electrode assembly, which includes a polymer electrolyte membrane of an amphiphilic block copolymer, is preferably applied to a fuel cell system.

The fuel cell system according to an exemplary embodiment of the present invention includes i) an electricity generating element which includes a membrane-electrode assembly including an anode and a cathode facing each other and a polymer electrolyte membrane which is interposed therebetween, and the polymer electrolyte membrane includes an amphiphilic block polymer having a hydrophobic block and a hydrophilic block, and ii) a separator positioned at both sides of the membrane-electrode assembly.

Additionally, if the fuel cell system is a polymer electrolyte fuel (PEMFC), the reformer which generates hydrogen from the hydrogen-containing fuel may be included.

The electricity generating element includes a polymer electrolyte membrane according to the present invention, a cathode and an anode positioned at both sides and a separator. Such an electricity generating element generates electricity through an electrochemical reaction of the hydrogen and oxidant.

The fuel supplier provides a hydrogen-containing fuel to the electricity generating element, and the oxidant supplier provides an oxidant, preferably oxygen or air, to the electricity generating element.

Figure 2:
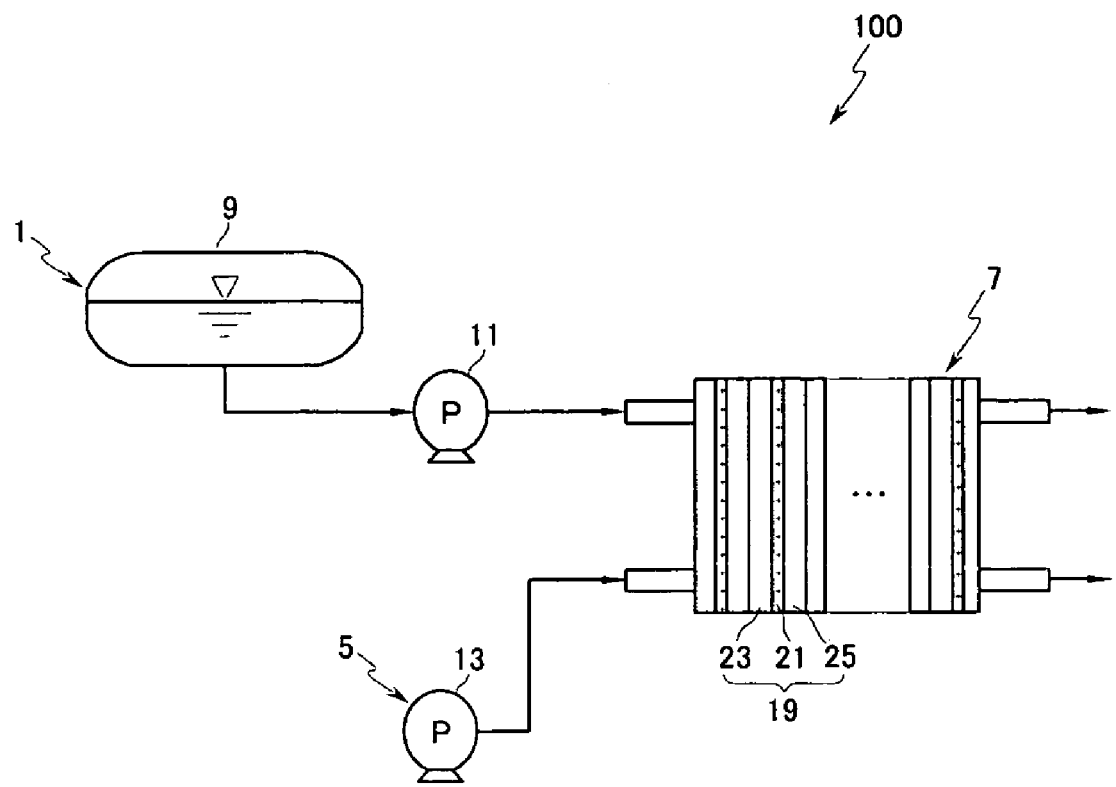
FIG. 2 is a schematic view illustrating a structure of a fuel cell system according to the present invention.

FIG. 2 is a schematic view of the fuel cell system according to the present invention, which hereinafter is described in more detail. The fuel cell system 100 of the present invention includes a stack 7 including at least one electricity generating element 19 which generates electrical energy through an electrochemical reaction, a fuel supplier 1 providing fuel, and an oxidant supplier 5 providing an oxidant to the electricity generating element 19.

According to this embodiment, the fuel supplier 1 is equipped with a fuel tank 9 from which fuel is supplied to stack 7 via a fuel pump 11.

The oxidant supplier 5 which provides oxidant to the electricity generating element 19 of the stack 7 comprises an air pump.

The electricity generating element 19 includes a membrane-electrode assembly 21 where oxidation/reduction reactions of fuel such as hydrogen or hydrocarbon-based fuels and oxiants occur, and separators 23 and 25 supplying the fuels and oxidantspositioned at both sides of the membrane-electrode assembly.

FIG. 2 illustrates a fuel cell system wherein a fuel and an oxidant are provided to the electricity generating element through pumps, but the present invention is not limited to such structures. The fuel cell system of the present invention alternately includes a structure wherein a fuel and an oxidant are provided in a diffusion manner.

The following examples illustrate the present invention in further detail; however, it is understood that the present invention is not limited by these examples.

EXAMPLE 1

A polymer electrolyte membrane was prepared with an amphiphilic block copolymer, represented by the following Formula 15, at 10 parts by weight, dissolved in sulfuric acid at 5 parts by weight, and dimethylformaldehyde at 100 parts by weight. The solution was heated for 10 hours under a reflux condition then cast into a film and immersed in water.

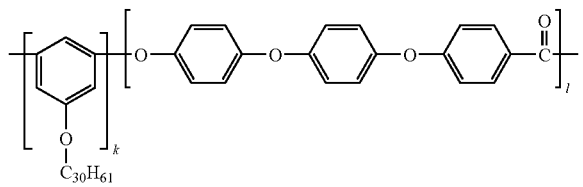

(15)

where in the above Formula 15, k is 10 and l is 100.

The membrane-electrode assembly was made by firing the polymer electrolyte membrane interposed between the cathode and the anode at 100° C. for 1 minute, and then hot-pressing it. The cathode and the anode were coated with a catalyst slurry prepared by mixing a platinum catalyst (PVC) supported on carbon powder, a polytetrafluoroethylene binder, and isopropylalcohol solvent, on carbon paper.

A unit cell was fabricated by interposing the resulting membrane-electrode assembly including a polymer electrolyte membrane where fine pores were formed therein between gaskets, and then interposed between two separators having reactant flow channels and cooling channels with a predetermined pattern, and then pressed between copper end plates.

EXAMPLE 2

A unit cell was fabricated according to the same method as in Example 1, except that $-C_5H_{11}$ was used instead of $-C_{30}H_{61}$ as a functional radical of the hydrophobic block of the amphiphilic block copolymer.

EXAMPLE 3

A unit cell was fabricated according to the same method as in Example 1, except that k=10 and l=50 in the above Formula 15.

EXAMPLE 4

A unit cell was fabricated according to the same method as in Example 1, except that $-C_5H_{11}$ was used instead of $-C_{30}H_{61}$ as a functional radical of the hydrophobic block of the amphiphilic block copolymer, and polyetherether ketone (PEEK) was used instead of polyetherketone (PEK) of the hydrophilic block.

Comparative Example 1

A polymer electrolyte membrane and a unit cell were fabricated according to the same method as in Example 1, except that commercially available NAFION™ 112 was used.

Hydrogen ($H_2$) gas and oxygen ($O_2$) gas without back pressure were injected to the anode and cathode of a unit cell with a stoichiometric flow amount of 2 and 1.3, respectively.

The unit cells were estimated to be under 60° C., the conductivity was measured under 100% humidity at room temperature, and mechanical strength (Young's Modulus)

was measured under 100% humidity at room temperature using an Instron testing machine.

TABLE 1

|  | Example 1 | Example 2 | Example 3 | Example 4 | Comp. Example 1 |
|---|---|---|---|---|---|
| conductivity (S/cm) | 0.10 | 0.07 | 0.13 | 0.1 | 0.08 |
| Young's Modulus (MPa) | 52 | 63 | 30 | 50 | 25 |
| power output current density at 0.4 V (mA/cm$^2$) | 720 | 700 | 752 | 708 | 682 |

As described in Table 1, a polymer including a hydrophobic block and a hydrophilic block as described in Examples 1-4 has high ion conductivity and mechanical stability, and high power output density.

In accordance with the present invention, a polymer electrolyte membrane can be prepared with an amphiphilic block copolymer including a hydrophobic block and a hydrophilic block. The polymer electrolyte membrane increases efficiency of the fuel cell system by maintaining strength and dimensional stability when it is swelled by water, processibility is increased due to improved flexibility, and increased ion conductivity can be maintained by the smooth movement of hydrogen through the hydrophilic block.

While this invention has been described in connection with what are presently considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A membrane-electrode assembly comprising:
an anode and a cathode; and
a polymer electrolyte membrane interposed therebetween, where the polymer electrolyte membrane comprises an amphiphilic block copolymer comprising a hydrophobic block and a hydrophilic block, wherein the hydrophobic block and the hydrophilic block of the amphiphilic block copolymer are present in a mole ratio from 0.2:0.8 to 0.5:0.5.

2. The membrane-electrode assembly of claim 1, wherein the amphiphilic block copolymer comprises a hydrophobic block and a hydrophilic block which are arranged in a block copolymer structure selected from the A-B type, A-B-A type, and B-A-B type, where A is a hydrophobic block and B is a hydrophilic block.

3. The membrane-electrode assembly of claim 1, wherein the weight average molecular weight of the hydrophobic block ranges from 10,000 to 100,000, and the weight average molecular weight of the hydrophilic block ranges from 20,000 to 500,000.

4. The membrane-electrode assembly of claim 1, wherein the hydrophobic block has a structure of the following Formula 1:

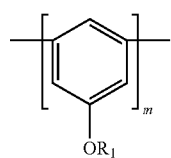

where $R_1$ is $C_nH_{2n+1}$ or $C_nF_{2n+1}$, and
n is an integer ranging from 1 to 100, and
m is an integer ranging from 1 to 100.

5. The membrane-electrode assembly of claim 1, wherein the hydrophilic block is selected from the group consisting of: unsaturated ethylene-based mono- or dicarboxylic acids; amides of unsaturated carboxylic acids; ethylene-based monomers comprising phosphonic acid groups, phosphate groups, phosphonate groups, or sulfonic acid groups; phosphated polyethylene glycol (meth)acrylates, phosphated propylethylene glycol (meth)acrylates, or derivatives thereof; cationic monomers; heterocyclic group-containing monomers comprising a secondary, tetriary, or quatemary ammonium functional group, nitrogen atoms, vinylainine, or ethyleneimine; poly ((alkyl) acrylic acid; cyclic amides of vinylamine; and combinations thereof.

6. The membrane-electrode assembly of claim 1, wherein the hydrophilic block exists in the form of a salt selected from the group consisting of chloride, sulfate, hydrogen sulfate, alkyl sulfate, phosphate, citrate, formate, acetate, and combinations thereof.

7. The membrane-electrode assembly of claim 1, wherein the hydrophilic block forms a hydrophilic domain having a size ranging from 10 nm to 500 nm.

8. The membrane-electrode assembly of claim 1, wherein the hydrophobic block forms a hydrophobic domain having a size ranging from 10 nm to 1000 nm.

9. A fuel cell system comprising:
an electricity generating element comprising
i) a membrane-electrode assembly including an anode and a cathode, and a polymer electrolyte membrane which is interposed therebetween and includes an amphiphilic block copolymer having a hydrophobic block and a hydrophilic block wherein the hydrophobic block and the hydrophilic block of the amphiphilic block copolymer are present in a mole ratio ranging from 0.2:0.8 to 0.5:0.5, and
ii) a separator positioned at both sides of the membrane-electrode assembly;
a fuel supplier; and
an oxidant supplier.

10. The fuel cell system of claim 9, wherein the amphiphilic block copolymer comprises a hydrophobic block and a hydrophilic block which are arranged in a block copolymer structure selected from the A-B type, A-B-A type, and B-A-B type, where A is a hydrophobic block and B is a hydrophilic block.

11. The fuel cell system of claim 9, wherein the weight average molecular weight of the hydrophobic block ranges from 10,000 to 100,000, and the weight average molecular weight of the hydrophilic block ranges from 20,000 to 500,000.

12. The fuel cell system of claim 9, wherein the hydrophobic block has a structure of the following Formmula 1:

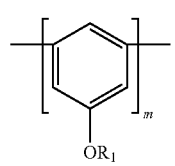

where $R_1$ is $C_nH_{2n+1}$ or $C_nF_{2n+1}$, and
n is an integer ranging from 1 to 100, and
m is an integer ranging from 1 to 100.

13. The fuel cell system of claim 10, wherein the hydrophilic block is selected from the group consisting of: unsaturated ethylene-based mono- or dicarboxylic acids; amides of unsaturated carboxylic acids; ethylene-based monomers comprising phosphonic acid groups, phosphate groups, phosphonate groups, or sulfonic acid groups; phosphated polyethylene glycol (meth)acrylates, phosphated prolyethylene glycol (meth)acrylates, or derivatives thereof; cationic monomers;heterocyclic group-containing monomers comprising a secondary, tetriary, or quaternary ammonium functional group, nitrogen atoms, vinylamine, or ethyleneimine; poly ((alkyl) acrylic acid; cyclic amides of vinylamine; and combinations thereof.

14. The fuel cell system of claim 9, wherein the hydrophilic block exists in the form of a salt selected from the group consisting of chloride, sulfate, hydrogen sulfate, alkyl sulfate, phosphate, citrate, formate, acetate, and combinations thereof.

15. The fuel cell system of claim 9, wherein the hydrophilic block forms a hydrophilic domain having a size from 10 nm to 500 nm.

16. The fuel cell system of claim 9, wherein the hydrophobic block forms a hydrophobic domain having a size from 10 nm to 1000 nm.

* * * * *

UNITED STATES PATENT AND TRADEMARK OFFICE
CERTIFICATE OF CORRECTION

PATENT NO.       : 7,625,650 B2
APPLICATION NO.  : 11/291102
DATED            : December 1, 2009
INVENTOR(S)      : Hee-Tak Kim, Young-Mi Park and Hae-Kwon Yoon It is certified that error appears in the above-identified patent and that said Letters Patent is hereby corrected as shown below:

Column 10, line 10,       Delete "quatemary"
                          Insert -- quaternary --

Column 10, line 11,       Delete "vinylainine"
                          Insert -- vinylamine --

Signed and Sealed this
Fifth Day of April, 2011

David J. Kappos
*Director of the United States Patent and Trademark Office*